(12) United States Patent
Barade et al.

(10) Patent No.: US 11,104,318 B2
(45) Date of Patent: Aug. 31, 2021

(54) PARKING BRAKE APPARATUS FOR A VEHICLE

(71) Applicant: Bendix Commercial Vehicle Systems LLC, Elyria, OH (US)

(72) Inventors: Girish Barade, Westlake, OH (US); Meviltan Mendis, Pune (IN); Christopher H Hutchins, Bay Village, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 261 days.

(21) Appl. No.: 16/214,635

(22) Filed: Dec. 10, 2018

(65) Prior Publication Data

US 2020/0180585 A1    Jun. 11, 2020

(51) Int. Cl.
| | |
|---|---|
| *B60T 17/18* | (2006.01) |
| *B60T 13/74* | (2006.01) |
| *B60T 13/26* | (2006.01) |
| *B60T 15/04* | (2006.01) |
| *B60T 13/68* | (2006.01) |

(52) U.S. Cl.
CPC ............ *B60T 17/18* (2013.01); *B60T 13/261* (2013.01); *B60T 13/686* (2013.01); *B60T 13/743* (2013.01); *B60T 13/745* (2013.01); *B60T 15/041* (2013.01); *B60T 2270/89* (2013.01)

(58) Field of Classification Search
CPC .... B60T 13/261; B60T 13/686; B60T 13/743; B60T 13/745; B60T 17/18; B60T 15/041; B60T 2270/89
See application file for complete search history.

(56) References Cited

U.S. PATENT DOCUMENTS

| | | | | |
|---|---|---|---|---|
| 6,951,528 B2 * | 10/2005 | Ewinger | ................. | B60T 7/045 192/219.4 |
| 7,644,996 B2 * | 1/2010 | Bredin | .................... | B60T 17/18 303/89 |
| 7,760,070 B2 * | 7/2010 | Ohtaki | ................. | B60R 25/252 340/5.53 |
| 8,044,788 B2 * | 10/2011 | Lundgren | ............... | B60T 17/22 340/457.3 |
| 9,150,208 B2 | 10/2015 | Schemmel | | |
| 9,248,817 B2 | 2/2016 | Accardi | | |

(Continued)

*Primary Examiner* — Vishal R Sahni
(74) *Attorney, Agent, or Firm* — Cheryl Greenly; Eugene Clair; Brian Kondas

(57) ABSTRACT

A parking brake apparatus is provided for a vehicle having components of a parking brake system and devices for providing a plurality of output signals indicative of a plurality of vehicle factors. The parking brake apparatus comprises an electronic controller that monitors the output signals indicative of a plurality of vehicle factors, monitors for a pre-startup sequence of the plurality of vehicle factors having been met, monitors for a driver request to unpark the vehicle, monitors for a pre-release sequence of the plurality of vehicle factors having been met, and applies one or more control signals to components of the parking brake system to release parking brakes based upon a valid pre-startup sequence of the plurality of vehicle factors having been met, a driver request to unpark the vehicle, and at least one valid pre-release sequence of the plurality of vehicle factors having been met.

5 Claims, 3 Drawing Sheets

(56) References Cited

U.S. PATENT DOCUMENTS

| | | | |
|---|---|---|---|
| 2004/0124697 A1* | 7/2004 | MacGregor | B60T 17/18 303/89 |
| 2008/0061928 A1 | 3/2008 | Bennett | |
| 2008/0148827 A1* | 6/2008 | Keski-Hynnila | G01M 15/05 73/114.31 |
| 2008/0191546 A1 | 8/2008 | Plantamura | |
| 2009/0133973 A1* | 5/2009 | Shibata | F16D 65/18 188/71.3 |
| 2011/0022283 A1 | 1/2011 | Lovell | |
| 2011/0256982 A1 | 10/2011 | Deblack | |
| 2014/0172240 A1* | 6/2014 | Schemmel | B60Q 9/00 701/49 |
| 2014/0172253 A1* | 6/2014 | Palmer | F16H 61/0213 701/56 |
| 2015/0233470 A1* | 8/2015 | Seay | F16H 61/0213 701/55 |
| 2015/0321654 A1 | 11/2015 | Si | |
| 2016/0214556 A1 | 7/2016 | McGoldrick | |
| 2017/0114697 A1* | 4/2017 | Zambrano | F01N 11/007 |
| 2017/0197603 A1* | 7/2017 | Minato | B60T 17/22 |
| 2018/0162413 A1* | 6/2018 | Theodosiou | E02F 9/163 |
| 2020/0180586 A1* | 6/2020 | Taneyhill | B60T 13/743 |

* cited by examiner

PARKING BRAKE APPARATUS FOR A VEHICLE

BACKGROUND

The present application relates to vehicle parking systems and is particularly directed to a parking brake apparatus for a vehicle such as a truck.

Vehicle parking systems for trucks are known. One type of vehicle parking system for trucks is an electronic parking system. In some electronic parking systems, the parking brake cannot be released unless a vehicle factor is met. For example, the parking brake cannot be released unless the vehicle driver is detected to be in the driver seat. In some other electronic parking systems, the parking brake cannot be released unless a multiple number of vehicle factors are met. Accordingly, those skilled in the art continue with research and development efforts in the field of vehicle parking systems including electronic parking systems in which the parking brake cannot be released unless one or more vehicle factors are met.

SUMMARY

In accordance with one embodiment, a parking brake apparatus is provided for a vehicle having components of a parking brake system and a number of devices providing a plurality of output signals indicative of a plurality of vehicle factors. The parking brake apparatus comprises an electronic controller arranged to (i) monitor the output signals indicative of a plurality of vehicle factors, (ii) monitor for a pre-startup sequence of the plurality of vehicle factors having been met, (iii) monitor for a driver request to unpark the vehicle, (iv) monitor for a pre-release sequence of the plurality of vehicle factors having been met, and (iv) provide one or more control signals to be applied to components of the parking brake system to release parking brakes based upon a valid pre-startup sequence of the plurality of vehicle factors having been met, a driver request to unpark the vehicle, and at least one valid pre-release sequence of the plurality of vehicle factors having been met.

In accordance with another embodiment, a parking brake apparatus is provided for a vehicle having components of a parking brake system. The parking brake apparatus comprises a plurality of vehicle factors and means for releasing parking brakes based upon occurrence of at least some of the plurality of vehicle factors in a predefined sequence.

In accordance with yet another embodiment, a program storage medium readable by a computer having a memory is provided. The medium tangibly embodies one or more programs of instructions executable by the computer to perform method steps for processing signals of a vehicle having components of a parking brake system and a number of devices providing a plurality of output signals indicative of a plurality of vehicle factor. The method comprises the step of releasing parking brakes based upon occurrence of at least some of the plurality of vehicle factors in a first predefined sequence and occurrence of at least some of the plurality of vehicle factors in a second predefined sequence that follows the first predefined sequence.

DETAILED DESCRIPTION

The present application is directed to a parking brake apparatus for a vehicle such as a truck. The specific construction of the parking brake apparatus may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
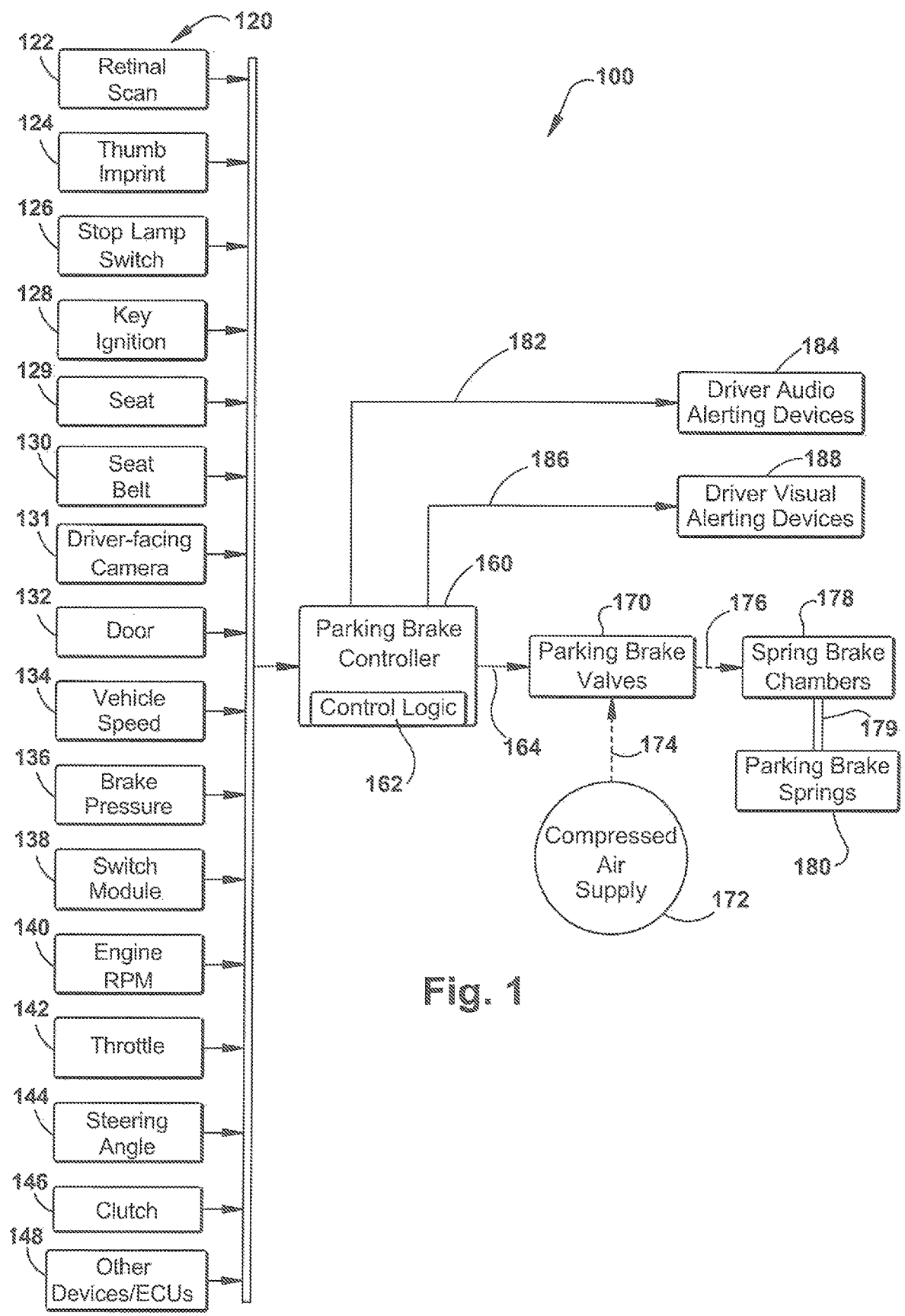
FIG. 1 is a schematic block diagram showing an example parking brake apparatus constructed in accordance with an embodiment.

Referring to FIG. 1, a schematic block diagram showing an example parking brake apparatus constructed in accordance with an embodiment is illustrated. In FIG. 1, electrical line connections are shown as solid lines, pneumatic lines connections are shown as dashed lines, and mechanical couplings are shown as double solid lines.

Parking brake apparatus 100 includes a number of devices 120 that provide a plurality of output signals indicative of a corresponding plurality of vehicle factors. More specifically, the devices 120 include but are not limited to a retinal scanner 122, a thumb imprint scanner 124, a stop lamp switch 126, a key ignition switch 128, a seat switch 129, a vehicle seat belt switch 130, a driver-facing camera 131, a vehicle door switch 132, a vehicle speed sensor 134, a brake pressure sensor 136, a switch module 138, an engine RPM sensor 140, a throttle position sensor 142, a steering angle sensor 144, a clutch position sensor 146, and other devices or electronic controller units (ECUs) 148.

Each of the output signals from the devices 120 is indicative of a corresponding vehicle factor. In particular, the output signal from the retinal scanner 122 is indicative of validity of the identity of the vehicle driver based upon a scan of the driver's retina. The output signal from the thumb imprint scanner 122 is indicative of validity of the identity of the vehicle driver based upon a scan of the driver's thumb print. The output signal from the stop lamp switch 126 is indicative of whether the vehicle driver's foot is on the foot brake pedal. The output signal from the key ignition switch 128 is indicative of whether the ignition is on.

The output from the vehicle seat switch 129 is indicative of whether the vehicle driver's seat is occupied. The output signal from the vehicle seat belt switch 130 is indicative of whether the vehicle driver's seat belt is buckled. The output signal from the driver-facing camera 131 is indicative of validity of the identity of the vehicle driver based upon a captured camera-image of the driver. The output signal from the vehicle door switch 132 is indicative of whether the vehicle driver's door is closed. The output signal from the vehicle speed sensor 134 is indicative of ground speed of the vehicle. The output signal from the brake pressure switch 136 is indicative of whether the vehicle driver is depressing the foot brake pedal. The output signal from the switch module 138 is indicative of driver intent to change the parking status of the vehicle.

The output signal from the engine RPM sensor 140 is indicative of the revolutions per minute of the vehicle engine. The output signal from the throttle position sensor 142 is indicative of the extent that the vehicle driver is depressing the foot accelerator pedal. The output signal from the steering angle sensor 144 is indicative of the angular extent to which the vehicle driver is turning vehicle steering wheel. The output signal from the clutch position sensor 146 is indicative of the extent to which the vehicle driver is depressing the foot clutch. The output signals from the other devices 148 are from other sources such as electronic controller units (ECUs) associated with the vehicle.

Parking brake apparatus 100 also includes a parking brake controller 160 in the form of an electronic controller unit that is arranged to monitor the output signals from the devices 120 indicative of the plurality of vehicle factors. The devices 120 may be hardwired or communicate via a controller area network (CAN) bus, or a combination of both, to the parking brake controller 160. The parking brake controller 160 provides one or more control signals based upon control logic 162 that is stored in a data storage unit of the parking brake controller 160. More specifically, parking brake controller 160 provides signals on line 164 to control operation of parking brake valves 170. Compressed air supply 172 provides a source of compressed air in line 174 to parking brake valves 170. Parking brake valves 170 are controlled by parking brake controller 160 to vary pneumatic pressure in line 176 to one or more chambers of spring brake chambers 178.

More specifically, when the parking brakes of the vehicle are applied, the parking brake controller 160 provides signals on line 164 that are applied to parking brake valves 170 so as to exhaust air in one or more chambers of spring brake chambers 178. The spring brake chambers 178 are operatively coupled via line 179 in known manner to parking brake springs 180. When air in spring brake chambers 178 is exhausted and system air pressure drops to less than about 45 psi to 60 psi, parking brake springs 180 are activated to apply the vehicle parking brakes, as is known. Structure and operation of parking brake controller 160 and parking brake valves 170 for controlling operation of spring brake chambers 178 and parking brake springs 180 of the vehicle are conventional and, therefore, will not be further described.

Parking brake controller 160 also provides a number of signals on line 182 to a number of driver audio alerting devices 184, and a number of signals on line 186 to a number of driver visual alerting devices 188. Other types of devices for alerting the vehicle driver are possible. For example, haptic devices may be used to alert the vehicle driver.

In accordance with an aspect of the present disclosure, the parking brake controller 160 monitors the output signals from the devices 120 and provides one or more control signals to be applied to components of the parking brake system to release the parking brakes based upon a valid pre-startup sequence of the plurality of vehicle factors having been met, a driver request to unpark the vehicle, and at least one valid pre-release sequence of the plurality of vehicle factors having been met.

A valid pre-startup sequence may comprise a predefined sequence of events on the CAN bus indicating that the vehicle is in a mode ready for driving/operation by an authorized user. Alternatively, or in addition to, a valid pre-startup sequence may comprise a number of discrete vehicle inputs indicating that the vehicle is in a mode ready for driving/operation by an authorized user.

A vehicle pre-startup sequence can be monitored through the other ECUs 148 (FIG. 1) for determining whether the vehicle is ready to be moved. For example, if an anti-lock braking system (ABS) ECU and a vehicle engine ECU are transmitting output signals to the CAN bus, it can be determined that the vehicle is active and the process can move forward. In a situation where there is a prime mover, not necessarily an internal combustion engine, the vehicle pre-startup sequence can be used instead of an ignition key. Alternatively, the ignition input may be used to determine a valid vehicle pre-startup sequence.

A valid pre-release sequence may comprise a predefined sequence of events on the CAN bus indicating that the vehicle parking brakes are ready to be released (either automatically or by the vehicle driver).

In some embodiments, the electronic controller is arranged to release the parking brakes when the at least one valid pre-release sequence of the plurality of vehicle factors having been met comprises all three criteria of (i) at least one priority one signal, (ii) at least one priority two signal, and (iii) at least one priority three signal, being met. The electronic controller 160 may also be arranged to discontinue any previously applied engine derates prior to the parking brakes being released. An engine derate is defined as a limitation on the torque or speed of the vehicle engine.

In some embodiments, the electronic controller 160 is arranged to provide a warning to a driver of the vehicle when the at least one valid pre-release sequence of the plurality of vehicle factors having been met comprises at least two of the following three criteria of (i) at least one priority one signal, (ii) at least one priority two signal, and (iii) at least one priority three signal, being met. The electronic controller 160 may also be arranged to release the parking brakes when an engine of the vehicle engine is derated. The electronic controller 160 may also be arranged to derate a predetermined percentage of an engine of the vehicle when the warning is provided to the vehicle driver.

In some embodiments, the electronic controller 160 is arranged to provide a warning to a driver of the vehicle when the at least one valid pre-release sequence of the plurality of vehicle factors having been met comprises only one or more priority two signals being met. The electronic controller may be arranged to release the parking brakes when an engine of the vehicle engine is derated. The electronic controller 160 may also be arranged to derate a predetermined percentage of an engine of the vehicle when the warning is provided to the vehicle driver.

In some embodiments, the electronic controller 160 is arranged to release the parking brakes when the driver makes a request to release the parking brakes and a combination of two predefined sequences of the plurality of vehicle factors occurs. One of the two predefined sequences of the plurality of vehicle factors may comprise a combination of priority one signals and priority two signals. The other one of the two predefined sequences of the plurality of vehicle factors may comprise a combination of priority two signals and priority three signals.

In some embodiments, the electronic controller 160 is arranged to provide a warning to a driver of the vehicle when the at least one valid pre-release sequence of the plurality of vehicle factors having been met comprises the two criteria of (i) at least one priority two signal, and (ii) at least one priority three signal, being met. Before the parking brakes can be released, both criteria must be met if no priority one signal is available or valid.

Figure 2:
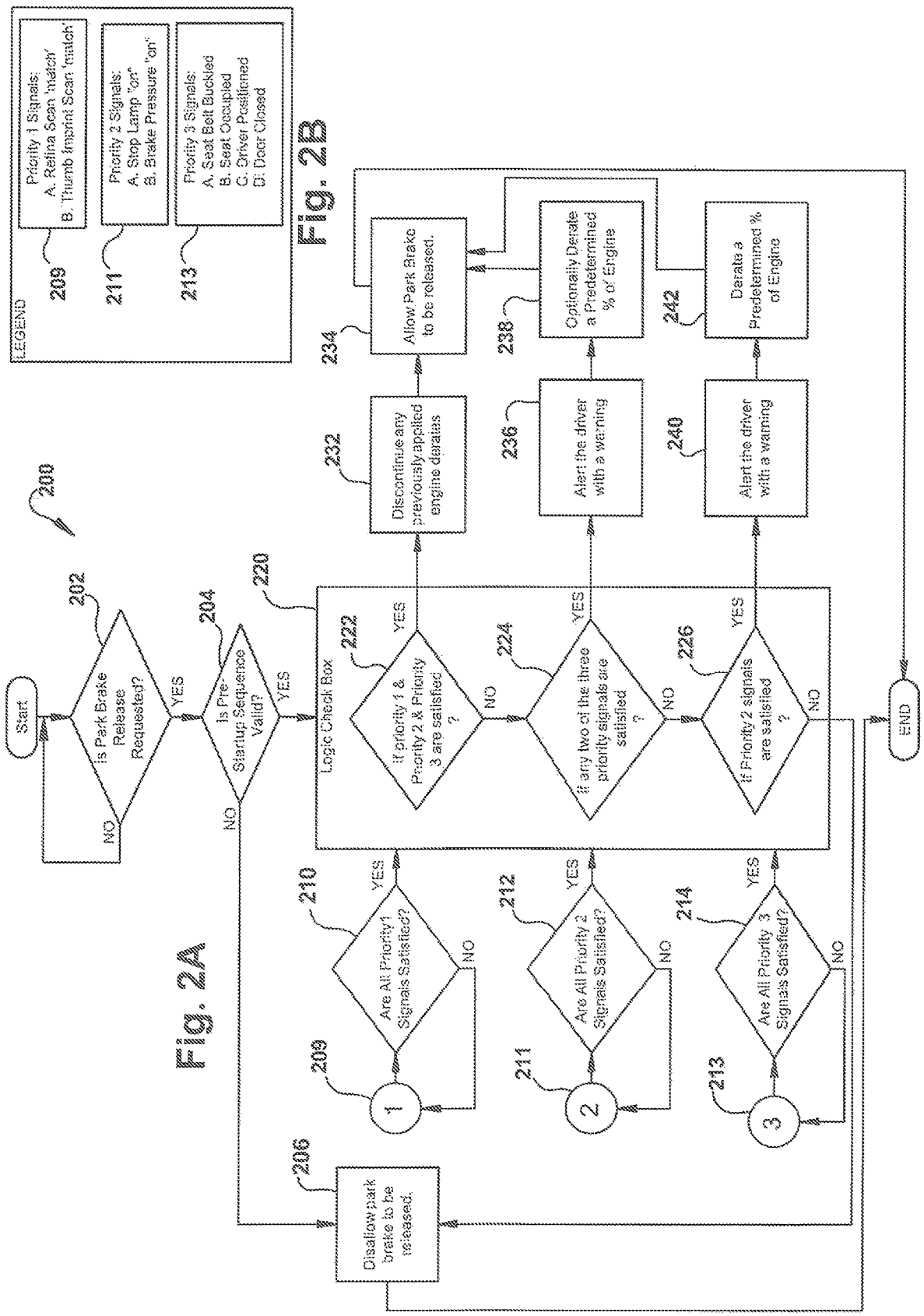
FIGS. 2A and 2B are a flow diagram depicting an example method of operating the parking brake apparatus of FIG. 1 in accordance with an embodiment.

Referring to FIGS. 2A and 2B, a flow diagram 200 depicting an example method of operating the parking brake apparatus 100 of FIG. 1 in accordance with an embodiment illustrated. In block 202, a determination is made as to whether a park brake release is requested. If the determination in block 202 is negative (i.e., a park brake release is not requested), the parking brake controller 160 continues to monitor the output signals from the devices 120 indicative of vehicle factors. However, if the determination in block 202 is affirmative (i.e., a park brake release is requested), the process proceeds to block 204.

In block 204, a determination is made as to whether a pre-startup sequence is valid. The pre-startup sequence may involve any combination of vehicle factors. As an example, the combination of vehicle factors may comprise only one vehicle factor, such as whether the vehicle ignition 128 is on. As another example, the combination of vehicle factors may comprise multiple vehicle factors, such as whether the vehicle ignition 128 is on and the retinal scan 122 is valid. These are only example combinations of vehicle factors for the pre-startup sequence. Other combinations of vehicle factors are possible.

If the determination in block 204 is negative (i.e., the pre-startup sequence is not valid), the process proceeds to block 206 in which the parking brakes are not allowed to be released. However, if the determination in block 204 is affirmative (i.e., the pre-startup sequence is valid), the process proceeds to block 220.

Block 220 is a logic check box that has three inputs from three decision blocks 210, 212, 214. In decision block 210, a determination is made as to whether all priority 1 signals are satisfied or met. If the determination in block 210 is affirmative (i.e., all priority 1 signals are met), a signal indicative thereof is provided to the logic check box 220. In decision block 212, a determination is made as to whether all priority 2 signals are satisfied or met. If the determination in block 212 is affirmative (i.e., all priority 2 signals are met), a signal indicative thereof is provided to the logic check box 220. In decision block 214, a determination is made as to whether all priority 3 signals are satisfied or met. If the determination in block 214 is affirmative (i.e., all priority 3 signals are met), a signal indicative thereof is provided to the logic check box 220.

More specifically, priority 1 signals to block 210 are shown as input circle 209 in FIG. 2A and as block 209 in the legend of FIG. 2B. The two priority 1 signals shown in block 209 in FIG. 2B (i.e., retina scan match and thumb imprint match) are only examples. The priority 1 signals may comprise any combination of output signals (including only one signal) from the devices 120 indicative of biometrics of the driver, including a breath measurement device, a heart rate monitor, facial recognition, voice recognition, or other unambiguous driver identification factors.

Priority 2 signals to block 212 are shown as input circle 211 in FIG. 2A and as block 211 in the legend of FIG. 2B. The two priority 2 signals shown in block 211 in FIG. 2B (i.e., stop lamp switch on and brake pressure switch on) are only examples. The priority 2 signals may comprise any combination of output signals (including only one signal) from the devices 120 indicative of vehicle factors.

Priority 3 signals to block 214 are shown as input circle 213 in FIG. 2A and as block 213 in the legend of FIG. 2B. The four priority 3 signals shown in block 213 in FIG. 2B (i.e., driver seat belt buckled, driver seat occupied, driver-facing camera confirmation of driver position, and driver door closed) are only examples. The priority 3 signals may comprise any combination of output signals (including only one signal) from the devices 120 indicative of the driver being in the correct position to safely drive the vehicle.

Logic check box 220 includes a predefined sequence of three decision blocks 222, 224, 226. Although only three decision blocks are shown in logic check box 220, more than three decision blocks or only two decision blocks may be used in logic check box 220. It is conceivable that one or more of the decision blocks in the logic check box 220 be disabled as desired, such as for special vehicle applications for example.

In block 222, a determination is made as to whether the priority 1, the priority 2, and the priority 3 signals are satisfied or met (i.e., all three decision blocks 210, 212, 214 are affirmative). If the determination in block 222 is affirmative, the process proceeds to block 232 in which any previously-applied engine derates are discontinued (as shown in block 232) before the parking brakes are allowed to be released (as shown in block 234). However, if the determination in block 222 is negative, the process proceeds to block 224.

In block 224, a determination is made as to whether any two of the priority 1, the priority 2, and the priority 3 signals are satisfied or met. If the determination in block 222 is affirmative, the process proceeds to block 236 in which the vehicle driver is alerted with a warning. The process proceeds to optional block 238 in which a predetermined percentage of the engine is derated before the parking brakes are allowed to be released (as shown in block 234). However, if the determination in block 224 is negative, the process proceeds to block 226.

In block 226, a determination is made as to whether the priority 2 signals (i.e., block 211) are satisfied or met. If the determination in block 226 is affirmative, the process proceeds to block 240 in which the vehicle driver is alerted with a warning. The process then proceeds to block 242 in which a predetermined percentage of the engine is derated before the parking brakes are allowed to be released (as shown in block 234). However, if the determination in block 226 is negative, the process proceeds to block 206 in which the parking brakes are not allowed to be released.

Figure 3:
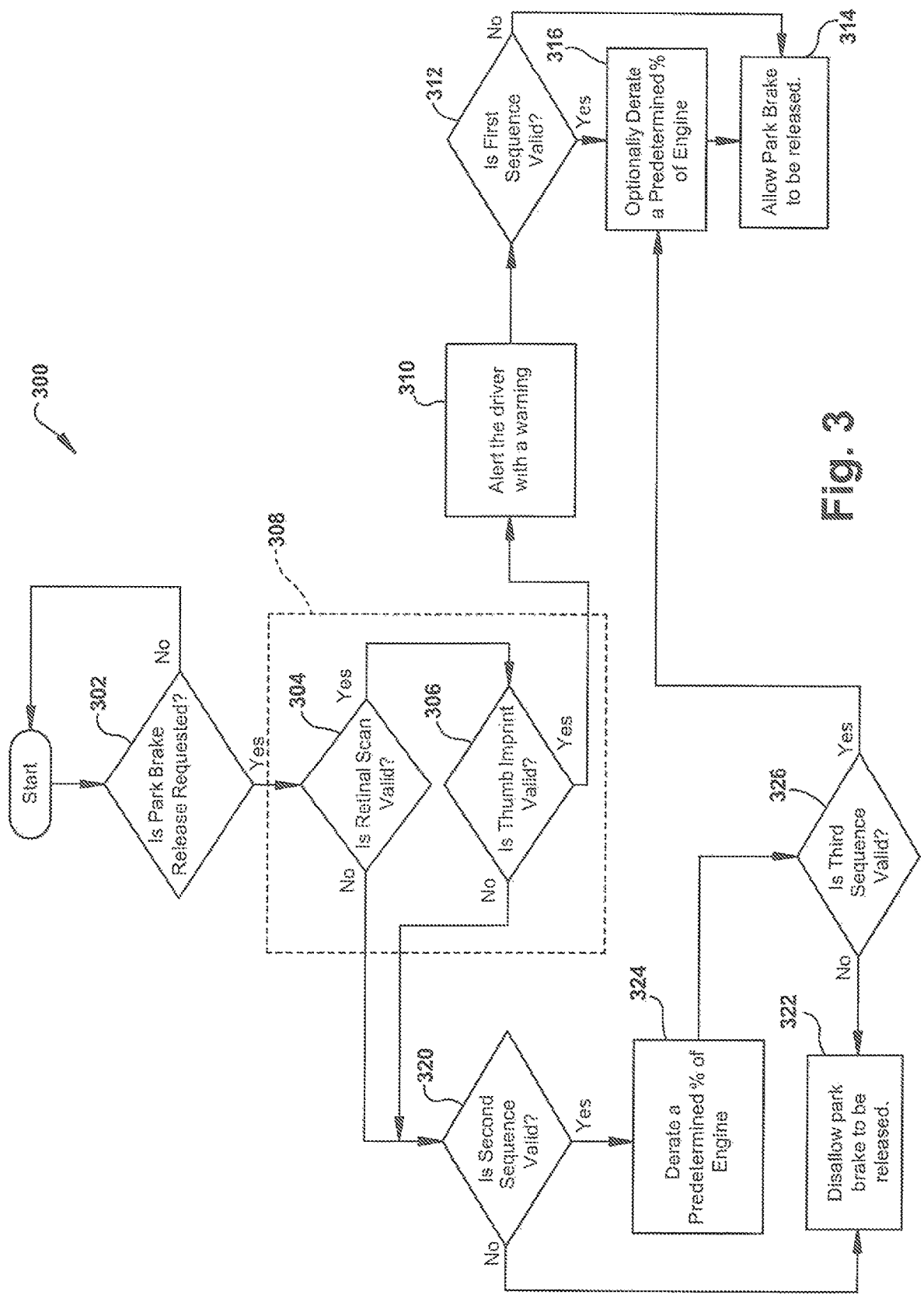
FIG. 3 is a flow diagram depicting an example method of operating the parking brake apparatus of FIG. 1 in accordance with another embodiment.

Referring to FIG. 3, a flow diagram 300 depicting an example method of operating the parking brake apparatus 100 of FIG. 1 in accordance with another embodiment is illustrated. In block 302, a determination is made as to whether a park brake release is requested. If the determination in block 302 is negative (i.e., a park brake release is not requested), the parking brake controller 160 continues to monitor the output signals from the devices 120 indicative of vehicle factors. However, if the determination in block 302 is affirmative (i.e., a park brake release is requested), the process proceeds to block 304.

In block 304, a determination is made as to whether the retinal scan 122 status is valid (i.e., a match). If the determination in block 304 is negative (i.e., the retinal scan is not a match), the process proceeds to block 320. However, if the determination in block 304 is affirmative (i.e., the retinal scan is a match), the process proceeds to block 306 in which a determination is made as to whether the thumb imprint scan 124 status is valid (i.e., a match). If the determination in block 306 is affirmative (i.e., the thumb imprint scan is a match), the process proceeds to block 310.

In block 310, the vehicle driver is alerted with a warning before proceeding to block 312. In block 312, a determination is made as to whether a first sequence is valid. The first sequence may involve any combination of vehicle factors. As an example, the combination of vehicle factors may comprise only one vehicle factor, such as whether the vehicle ignition 128 is on. As another example, the combination of vehicle factors may comprise multiple vehicle factors, such as whether the vehicle ignition 128 is on and the stop light switch 126 is on. These are only example combinations of vehicle factors for the first sequence. Other combinations of vehicle factors are possible.

If the determination in block 312 is negative (i.e., the first sequence is not valid), the process proceeds to block 314 in which the parking brakes are allowed to be released. However, if the determination in block 312 is affirmative (i.e., the first sequence is valid), the process proceeds to optional block 316 in which a predetermined percentage of the engine is derated before the parking brakes are allowed to be released (as shown in block 314).

However, if the determination back in block 306 is negative (i.e., the thumb imprint is not a match), the process proceeds to block 320. In block 320, a determination is made as to whether a second sequence is valid. The second sequence may involve any combination of vehicle factors. The second sequence of block 320 may comprise the combination of the retinal scan (i.e., block 304) and the thumb imprint scan (i.e., block 306), which combination is shown together in dotted line 308 in FIG. 3. The second sequence may be the same as the first sequence shown in block 312.

If the determination in block 320 is negative (i.e., the second sequence is not valid), the process proceeds to block 322 in which the parking brakes are not allowed to be released. However, if the determination in block 320 is affirmative (i.e., the second sequence is valid), the process proceeds to block 324 in which a predetermined percentage of the engine is derated before proceeding to block 326.

In block 326, a determination is made as to whether a third sequence is valid. The third sequence of block 326 may involve any combination of vehicle factors. The third sequence may involve one or more vehicle factors indicative of whether a driver is in the vehicle driver's seat. As an example, a determination may be made as to whether the captured image from the driver-facing camera 131 is valid. Alternatively, or in addition to, a determination may be made as to whether the stop light switch 126 is on, the seat belt 130 is buckled, or the vehicle door 132 is closed. These are only example combinations of the third sequence. Other combinations are possible.

If the determination in block 326 is affirmative (i.e., the third sequence is valid), the process proceeds to optional block 316 in which a predetermined percentage of the engine is derated before proceeding to block 314. In block 314, the parking brakes are allowed to be released. However, if the determination in block 326 is negative (i.e., the third sequence is not valid), the process proceeds to block 322 in which the parking brakes are not allowed to be released.

It should be apparent that the above-described parking brake apparatus 100 provides a parking brake system in which the parking brakes are released based upon occurrence of at least some of the plurality of vehicle factors in a predefined sequence. The plurality of vehicle factors are selected from retinal scan status, thumb imprint scan status, stop lamp switch status, key ignition switch status, seat occupancy status, seat belt status, driver-facing camera status, door status, vehicle speed status, brake pressure switch status, switch module status, engine RPM status, throttle position status, steering angle status, clutch position status, and electronic controller unit status. At least some of the plurality of vehicle factors comprise priority one signals, at least some of the plurality of vehicle factors comprise priority two signals, and at least some of the plurality of vehicle factors comprise priority three signals.

The above vehicle factors are only example vehicle factors. Other vehicle factors are possible. As an example, a lateral acceleration device providing an output signal indicative of vehicle yaw or a longitudinal acceleration device providing an output signal indicative of vehicle pitch may be used as vehicle factors. Any combination of devices may be used.

It should also be apparent that the above-described parking brake apparatus 100 provides a parking brake system in which the parking brakes are released based upon occurrence of at least some of the plurality of vehicle factors in a first predefined sequence and occurrence of at least some of the plurality of vehicle factors in a second predefined sequence that follows the first predefined sequence. For example, in the embodiment shown in FIGS. 2A and 2B, the determination in block 222 is followed in sequence by the determination in block 224 which, in turn, is followed by the determination in block 226. As another example, in the embodiment shown in FIG. 3, the determination in block 320 (i.e., the second sequence) is followed in sequence by the determination in block 326 (i.e., the third sequence).

It should further be apparent that the above-described parking apparatus provides a parking brake system in which the release of the parking brakes is based upon a prioritization of vehicle interlocks, and not based upon a requirement that all of the vehicle interlocks be satisfied. By providing a parking brake system in which the release of the parking brakes is based upon a prioritization of vehicle interlocks, potential vehicle downtime can be avoided. Also, non-operation of the vehicle under certain conditions can be avoided.

Program instructions for enabling the parking brake controller 160 shown in FIG. 1 to perform operation steps in accordance with flow diagram 200 shown in FIG. FIGS. 2A and 2B, or flow diagram 300 shown in FIG. 3, may be embedded in memory internal to parking brake controller 160. Alternatively, or in addition to, program instructions may be stored in memory external to parking brake controller 160. As an example, program instructions may be stored in memory internal to a different electronic controller of the vehicle. Program instructions may be stored on any type of program storage media including, but not limited to, external hard drives, flash drives, and compact discs. Program instructions may be reprogrammed depending upon features of the particular electronic controller.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although the above description describes use of one electronic controller unit, it is conceivable that any number of electronic controller units may be used. Moreover, it is conceivable that any type of electronic controller unit may be used. Suitable electronic controller units for use in vehicles are known and, therefore, have not been described. Accordingly, the program instructions of the present disclosure can be stored on program storage media associated with one or more vehicle electronic controller units.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A parking brake apparatus for a vehicle having components of a parking brake system and a number of devices providing a plurality of output signals indicative of a plurality of vehicle factors, the parking brake apparatus comprising:

an electronic controller arranged to (i) monitor the output signals indicative of the plurality of vehicle factors, (ii) monitor for a pre-startup sequence of the plurality of vehicle factors having been met, (iii) monitor for a driver request to unpark the vehicle, (iv) monitor for a pre-release sequence of the plurality of vehicle factors having been met, and (v) provide one or more control signals to be applied to components of the parking brake system to release parking brakes based upon a valid pre-startup sequence of the plurality of vehicle factors having been met, a driver request to unpark the vehicle, and at least one valid pre-release sequence of the plurality of vehicle factors having been met, wherein the electronic controller is arranged to provide a warning to a driver of the vehicle and derate a predetermined percentage of an engine of the vehicle when the at pre-release sequence of the plurality of vehicle factors comprises less than (i) at least one signal indicative of the biometrics of the driver, (ii) at least one signal indicative of vehicle service brake factors, and (iii) at least one signal indicative of the driver position in the vehicle being met.

2. The parking brake apparatus according to claim 1, wherein the electronic controller is arranged to discontinue any previously applied engine derates prior to the parking brakes being released when the pre-release sequence of the plurality of vehicle factors comprising all of the following (i) at least one signal indicative of the biometrics of the driver (ii) at least one signal indicative of vehicle service brake factors, and (iii) at least one signal indicative of the driver position in the vehicle being met.

3. The parking brake apparatus as in claim 1, wherein the at least one signal indicative of the biometrics of the driver is one of a breath measurement signal indicating a driver is in the vehicle, a heart rate signal indicating a driver is in the vehicle, a facial recognition signal indicating an authorized driver is in the vehicle, a retinal scan signal indicating an authorized driver is in the vehicle, a thumb imprint scan signal indicating an authorized driver is in the vehicle and a voice recognition signal indicating an authorized driver is in the vehicle.

4. The parking brake apparatus as in claim 1, wherein the at least one signal indicative of vehicle service brake factors is one of a stop lamp switch signal indicating air pressure is being provided to activate the stop lamps and a brake pressure switch signal indicating the service brake pedal is being depressed.

5. The parking brake apparatus as in claim 1, wherein the at least one signal indicative of the driver position in the vehicle is one of a driver seat belt signal indicating the seat belt is buckled, a driver-facing camera signal indicating the driver is in a driver's seat, a driver's seat occupation signal indicating the driver is in the driver's seat, and a driver's door signal indicating that the driver's door is closed.

* * * * *